April 14, 1942. R. W. ROSS 2,279,528
CONTROL APPARATUS
Filed July 3, 1940 3 Sheets-Sheet 1
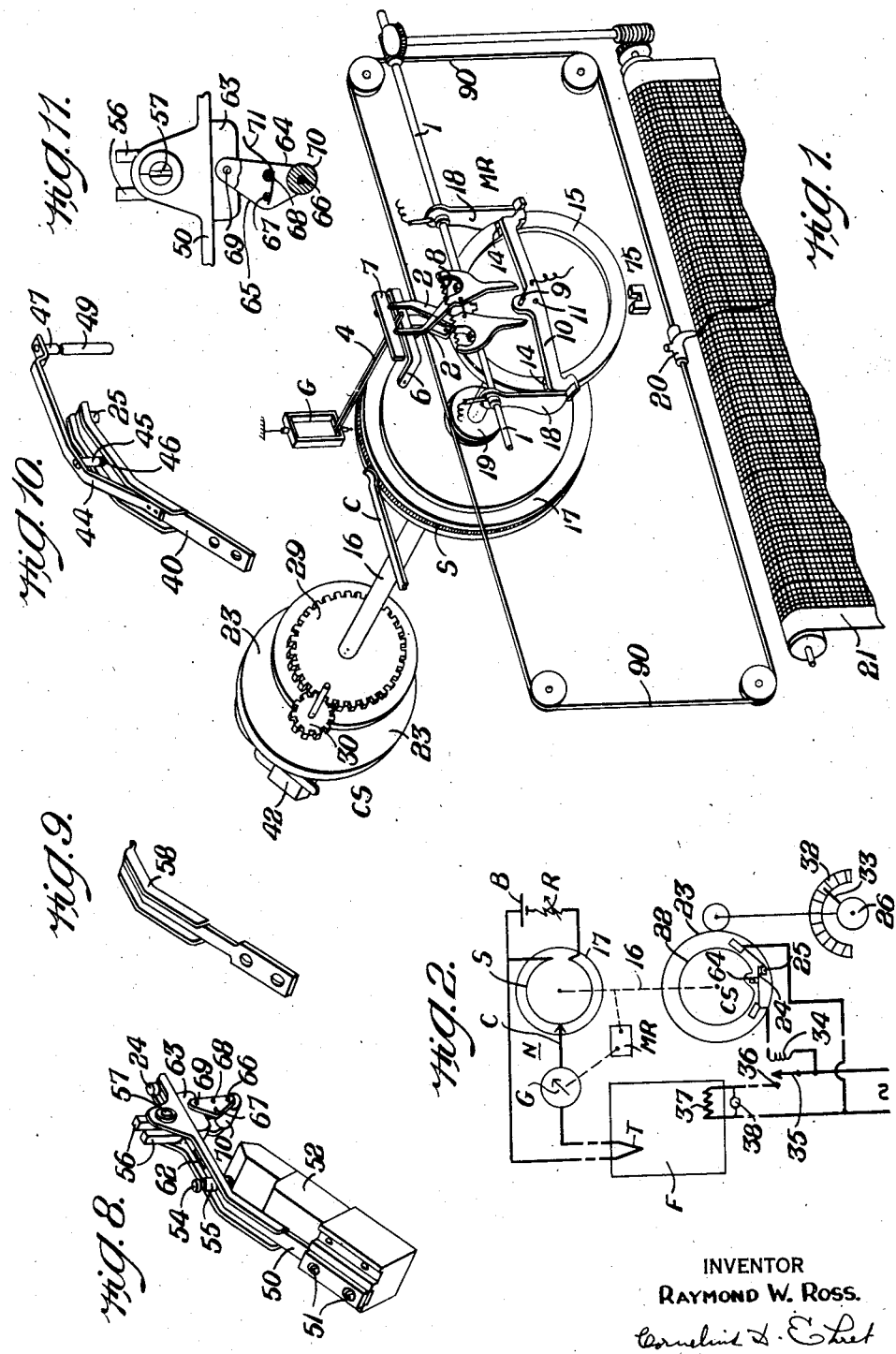
INVENTOR
RAYMOND W. ROSS.
ATTORNEY

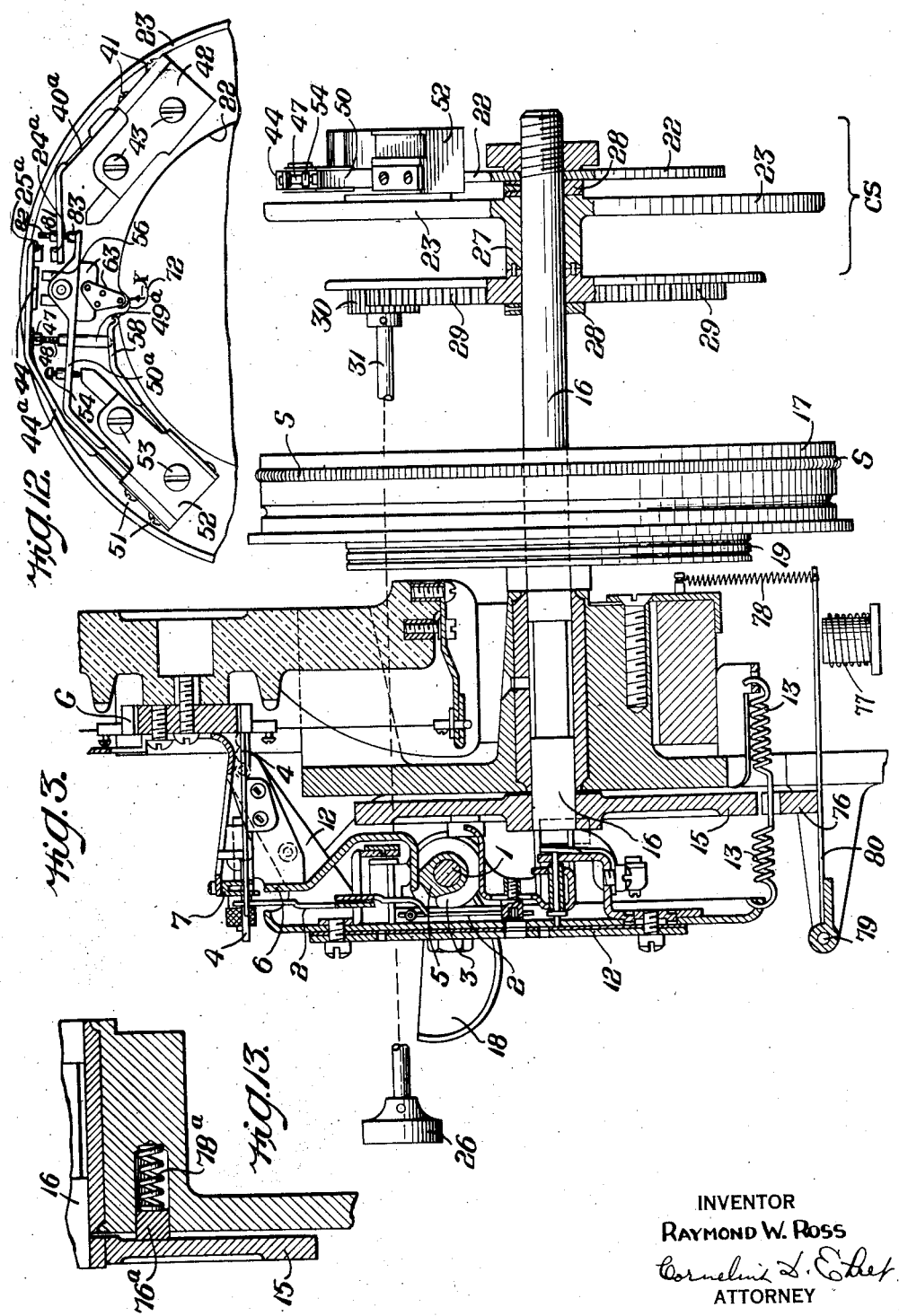

INVENTOR
RAYMOND W. ROSS
ATTORNEY

Patented Apr. 14, 1942

2,279,528

UNITED STATES PATENT OFFICE 2,279,528

CONTROL APPARATUS

Raymond W. Ross, Philadelphia, Pa., assignor to Leeds & Northrup Company, Philadelphia, Pa., a corporation of Pennsylvania Application July 3, 1940, Serial No. 343,761

21 Claims. (Cl. 236—70)

My invention relates to control apparatus having a member, movable in response to changes in magnitude of a condition such as temperature, pressure, or other physical, electrical or chemical condition, which is effective when it passes through the control point, a position corresponding with a desired or predetermined magnitude of said condition, to actuate at least one circuit-controlling device or switch utilized, for example, to vary the application of an agent affecting the magnitude of said condition or to control a signal device.

In accordance with my invention, it is provided that upon slight movement of said member in either direction through the control point, the contacts of the circuit-controlling device are abruptly relatively moved to substantial extent toward or from engagement with each other, and that the transitions from "closed" to "open" and from "open" to "closed" circuit positions of the contacts for opposite directions of movement of said member occur for positions thereof which are insubstantially displaced from each other and from the control point notwithstanding the aforesaid substantial extents of movements of the contacts effected during the transitions.

More particularly, the aforesaid control member is a cam or notched disc which is actuated in response to changes in magnitude of the condition and which, in moving through its position corresponding with the control point, effects relative movement of a magnet and its armature abruptly to break or make an electrical circuit comprising contacts at least one of which is movable with or by the magnet or its armature; more particularly, the cam or control disc maintains the contacts in the open and closed circuit positions to and from which they are moved by the magnet.

Further in accordance with my invention, when the aforesaid disc or cam is included in a controller or recorder of the self-balancing type utilizing a mechanical relay mechanism, the cam is intermittently coupled to the mechanical relay mechanism for adjustment concurrently with rebalancing adjustment of an impedance included in a balanceable circuit; more particularly, there is provided a brake effective upon said disc and the adjustable element of said impedance to avoid false or undesired adjustment of said impedance by reaction upon said member of forces involved in separation or engagement of aforesaid switch contacts.

My invention further resides in the features of construction, combination and arrangement hereinafter described and claimed.

For an understanding of my invention and for illustration of preferred modifications thereof, reference is made to the accompanying drawings, in which:

Fig. 1, in perspective, illustrates significant elements of a controller;

Fig. 2 is a diagram of a typical system utilizing the controller shown in Fig. 1;

Fig. 3 is a side view, partly in section, of significant elements of the controller shown in Fig. 1;

Figure 5:
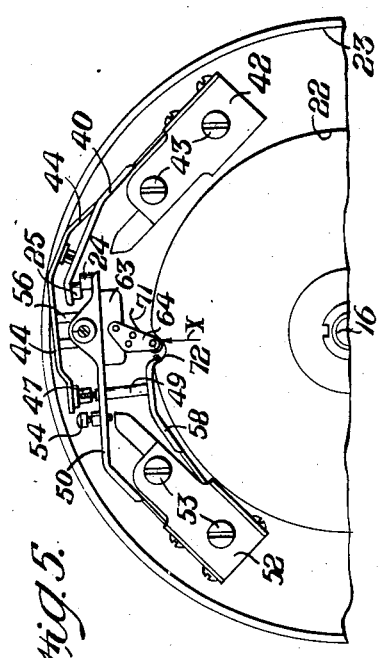

Figs. 4 to 7, in rear elevation, show the switch device of Fig. 3 with its elements in various positions;

Figs. 8 to 10 are perspective views of elements of the switch shown in Figs. 4 to 7;

Fig. 11 is a fragmentary view, on enlarged scale, of the assembly shown in Fig. 8;

Fig. 12 illustrates another modification of the switch shown in Figs. 4 to 7;

Fig. 13 is a detail view, in section, illustrating a braking arrangement alternative to the one shown in Fig. 3.

Referring to Fig. 2, which by way of example concerns the control of temperature of a furnace, the galvanometer G is included in a balanceable network N comprising the thermocouple T, responsive to changes in temperature of furnace F, and the potentiometer slidewire S, adjustable with respect to its contact C to rebalance the network N. The slidewire current supplied by battery B or equivalent source is adjustable by the rheostat R to predetermined value for which the slidewire is calibrated.

The deflections of the galvanometer, occurring upon unbalance of network N, are utilized automatically to effect, through mechanical relay MR, rebalancing adjustments of slidewire S. Though any suitable mechanical relay may be utilized, that shown in Figs. 1 and 3 and herein briefly described, is similar to the mechanical relay disclosed in Letters Patent No. 1,935,732 to Squibb, Letters Patent Nos. 2,074,117, 2,096,064, 2,113,069 and 2,113,748 to myself and another, and Letters Patent No. 2,119,108 to Lane.

Referring to Figs. 1 and 3, for part of each revolution of shaft 1, which is driven at constant speed, preferably by a synchronous motor, or a motor with a suitable governor, the feelers 2, 2 are moved away from pointer 4 of galvanometer G and from each other by cams 3. During this part of the cycle of the relay mechanism, the galvanometer is free to deflect in response to unbalance of network N occasioned by change in temperature of furnace F. Thereafter in the cycle, the cam 5 on shaft 1 lifts the lower clamping member 6 to hold the pointer 4 against the upper clamping member 7.

Subsequently in the cycle, the feelers 2, 2 are released, for movement by spring 8, toward each other for engagement with opposite sides of the clamped pointer. Assuming the pointer is clamped to the right or left of its neutral or central position corresponding with balance of network N, one or the other of feelers 2, 2 must move beyond its central position in order to engage and be arrested by the clamped pointer. In so moving beyond its central or neutral position, the lower end of the feeler engages pin 9 extending from the driving clutch arm 10 and so moves clutch arm 10 about its pivot 11 through an angle corresponding with the extent of deflection of the pointer.

Immediately after arm 10 has been displaced from its neutral position, its supporting frame 12, under the control of a cam on shaft 1 and spring 13, is moved to effect engagement of the shoes 14, 14 of arm 10 with the rim of the driven clutch member or disc 15 attached to shaft 16 to which is also attached the supporting disc 17 of the slidewire S.

To shaft 16 is also attached pulley 19 over which passes the cord 99 connected to the marker or index 20 associated with a scale and/or a recorder chart 21.

While the clutch members 10, 15 are engaged, one or the other of cams 18 on shaft 1 engages the arm 10 and returns it to the horizontal or neutral position, Fig. 1, and concurrently moves shaft 16 to corresponding extent to effect a rebalancing adjustment of slidewire S and movement of index or marker 20.

From the foregoing, it will be understood the mechanical relay mechanism MR under the control of galvanometer G effects or maintains balance of network N and provides for a continuous indication and/or record of the furnace temperature.

For control of the temperature of the furnace and/or actuation of a signal or alarm when the temperature is above or below a desired magnitude thereof, there is provided a control switch CS preferably comprising an operating cam or disc 22 attached to shaft 16 and a second disc 23, which supports the relatively movable switch members 24, 25 and is adjustable coaxially of cam 22 by knob 26, conveniently located at the front of the recorder apparatus. The hub 27 of disc 23 is loosely fitted to shaft 16 between the collars 28 and is attached to or integral with gear 29 in mesh with gear 30 on the inner end of the shaft 31 to which knob 26 is attached.

The scale 32, Fig. 2, associated with the index 33 of knob 26 is so calibrated that it indicates the furnace temperature at which control cam 22 is effective to move switch members 24, 25 from one to another of their circuit-controlling positions. In the particular system shown in Fig. 2, when the furnace temperature falls to the control point indicated by scale 32, the switch 24, 25 closes to effect energization of the coil of relay 34 whose contacts 35, 36 thereupon close to energize the heating coil 37 of furnace F and/or the signal light 38 or equivalent indicator; conversely when the temperature rises to the control point, the contacts 24, 25 separate to deenergize relay 34 so to effect deenergization of heater 37 and/or signal 38.

It is essential that contacts 24 and 25 separate abruptly and widely for movement of disc 22 within an extremely small angle; otherwise they may be badly burned by arcing and may also, in locations subject to vibration, chatter badly when the temperature is near the control point—as it should be if properly controlled—so causing unnecessary and undesired operations of relay 34 and unnecessary and undesired fluctuations of heat input to the furnace. It is also essential for proper control action that engagement and separation of contacts 24 and 25 should occur, for movement of disc 22 in opposite directions, always at the same angular position thereof or at least for different angular positions of disc 22 which are but insubstantially different from each other. All of these essential relations must be preserved for all settings of disc 23 without appreciable effect by gravity upon the positions or movements of the contacts. Moreover, the forces tending to effect engagement or separation of contacts 24, 25 should not be permitted to move shaft 16 from any position to which it has been moved by the mechanical relay MR or by any equivalent thereof.

It is, of course, understood these requirements should be satisfied whether the condition under measurement be temperature or some other condition, such as pressure, liquid-level, ion-concentration, and whether the network N be a potentiometer, or some other type of balanceable network, such as a Wheatstone bridge.

The foregoing requirements are met by the control switch construction shown in Figs. 4 to 7.

Contact 25 is carried by the resilient arm 40 attached as by screws 41, to the block 42 of insulation secured as by screws 43 to the face of disc 23 suitably beyond the periphery of the notched disc 22. To arm 40 is secured a second resilient arm 44 of steel, or other suitable magnetic material, to which is riveted a hollow sleeve 45 internally threaded to receive the adjustable stop 46, Fig. 10, which engages arm 40. Near its free end and beyond arm 40, arm 44 is provided with another hollow sleeve 47 which threadably receives the upper end of stud 48 whose lower end is threaded into or otherwise attached to the rod 49, of Lucite, or other suitable insulating material.

The other contact of switch CS, contact 24, is carried by the resilient arm 50, Figs. 4–8, attached as by screws 51 to the block 52 of insulation secured as by screws 53 to disc 23 beyond the periphery of control disc 22. The adjustable stop 54, threadably received by sleeve 55 suitably fastened to arm 50, is engageable by an extension of block 52 to limit the extent of movement of arm 50 toward disc 22. A small permanent magnet 56 is secured to arm 50, as by the clamping screw 57, and for reasons which hereinafter appear, is insulated from arm 50 and screw 57 in any suitable manner, as by sheet fibre.

To the underside of block 52 is secured, as by screws 59, a third resilient arm 58 whose free end, suitably bent, rides upon the periphery of disc 22 and for certain positions thereof, as hereinafter explained, is in engagement with an end of rod 49 which extends from armature 44 of one contact assembly (Fig. 10) through slot 62 in arm 50 of the other contact assembly (Fig. 8).

To the under side of arm 50 is attached block 63 (Fig. 11) upon which is pivotally mounted the cam follower assembly 64 comprising two plates 65 connected by rivets 66, 67, 68, and free to swing about pin 69 extending through block 63. The roller 70, free to rotate about pin 66 between plates 65, engages the periphery of cam 22 except as hereinafter described. The spring 71 looped about pin 68 and having its free ends disposed respectively for engagement with the under side of pin 61 and the under side of block 63, biases the cam follower assembly 64 away from block 63 or toward engagement with cam 22.

For purposes of explanation, it is assumed the control disc 22 is provided with a radial index X terminating at that point along notch 72 of disc 22 which is engaged by roller 70 of cam follower 64 when the relative position of discs 22 and 23 corresponds with the control point.

Figure 4:
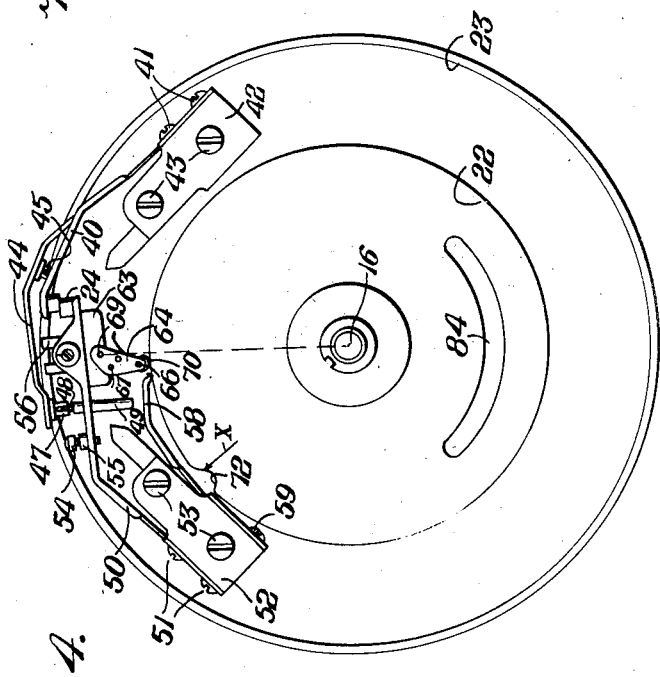

So long as the roller 70 of cam follower 64 engages disc 22 to the right of its notch 72, the contacts 24, 25 are held in engagement with each other, Fig. 4, by the disc 22 and cam follower 64 in opposition to the biasing forces exerted by the spring arms 50 and 40. For this position of cam follower 64, Fig. 4, its pin 67 is pressed against the underside of block 63 with the point of engagement between roller 70 and disc 22 to the left of the line of centers from pin 69 to shaft 16. As disc 22 moves in a clockwise direction from the position shown in Fig. 4 toward the position shown in Fig. 5, the roller 70 rides down the right-hand side of notch 72 to allow both contact arms 40 and 50 to swing inwardly toward the shaft 16; because arms 40, 50 swing in arcs having different and substantially spaced centers, the faces of contacts 24, 25 slide across one another, as evident by comparison of Figs. 5 and 4, so maintaining themselves clean.

This inward movement of cam follower 64 causes engagement of magnet 56 with its armature 44 and engagement of bar 49, mechanically connected to armature 44, with the cam follower 58. As disc 22 continues to move in clockwise direction, the cam roller 72 drops lower and lower into notch 72 and cam follower 58 concurrently rises to produce an increasing force tending to move contact arm 40 away from disc 22 in opposition to its bias and in opposition to the attraction between the magnet 56 and its armature 44. When that force predominates, the armature abruptly separates from the magnet 56 with immediate great reduction of the attractive force between them; contacts 24, 25 therefore abruptly separate and rapidly move to their widely separated position shown in Fig. 6. The change in angular position of disc 22 from Fig. 5 to Fig. 6 is very small; for example, less than one degree or about the order of twenty minutes.

Figure 7:
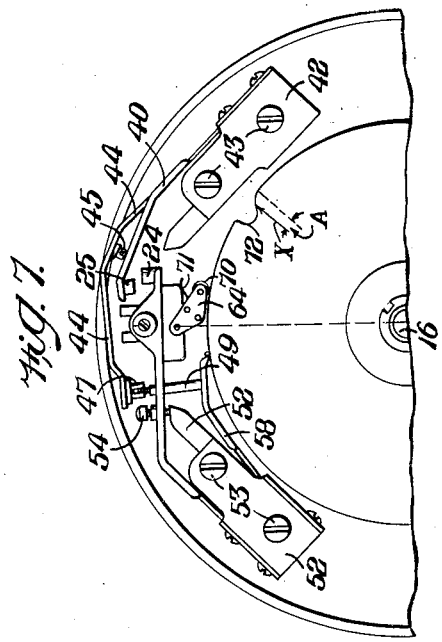
Figure 6:
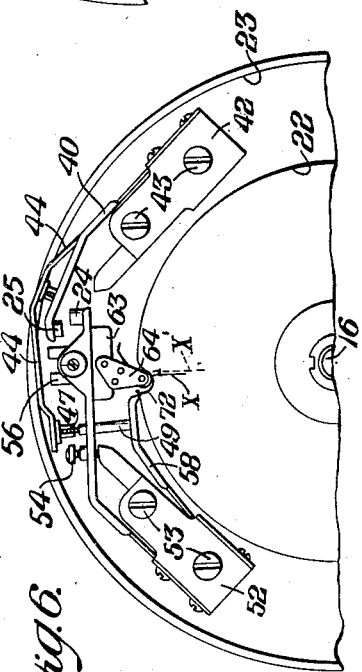

For continued further movement of disc 22 in clockwise direction, from the position shown in Fig. 6 to that of Fig. 7, for example, the parts of the assembly including the outer contact 25 remain in the position shown in Fig. 6, because of continued engagement of rod 49 of the outer contact assembly with resilient cam follower 58 as the latter rides along that portion of cam disc 22 to the left of notch 72 and having uniform radius; the parts of the inner contact assembly, except follower 64, also remain in the same position shown in Fig. 6 because of continued engagement of stop 54 with support 52. The follower 64, however, because of engagement of roller 70 with the left-hand rise of notch 72, is swung in counterclockwise direction about its pivot 69 so that the point of engagement of roller 70 of follower 64 with disc 22 is shifted to the right of the line of centers between shaft 16 and pivot 69 of follower 64. The biasing spring 71 now serves to maintain roller 70 in engagement with disc 22 even though, because of some particular control point settings of disc 23, the cam follower 64 would otherwise swing away from disc 22 and therefore be inoperative to effect reclosure of the contacts upon reverse movement of disc 22 through the control point.

The contacts 24, 25 remain separated for movements of the disc 22 in either direction toward or from the control point until disc 22 moves in counterclockwise direction through the position shown in Fig. 6 to the immediately adjacent position shown in Fig. 5; during this movement of disc 22, the roller 70 under the influence of biasing spring 71 rolls down the steep left-hand side of notch 72 allowing cam follower 64 to swing freely in counterclockwise direction about its pivot 69 until its stop 67 engages block 63 whereupon for continued movement of disc 22 in the same direction the resilient arm 50 is flexed away from the disc 22. At or about the position of disc 22 shown in Figs. 5 and 6, the magnet 56 is so close to its armature that the attraction between them is sufficient to effect their further movement toward each other and so to effect engagement of contacts 24, 25.

For further counterclockwise movement of disc 22, it is effective through cam follower 64 outwardly to flex both spring arms 40 and 50 to their positions shown in Fig. 4. During this movement of the arms, they swing in different arcs to effect mutual wiping of contacts 24, 25 and to separate the magnet 56 from its armature.

From the foregoing, it will be understood that in normal operation of the recorder, once disc 22 has moved in counterclockwise direction through the position shown in Fig. 5, the contacts 24, 25 will remain in engagement for all subsequent movements of the disc 22 in either direction until in moving in clockwise direction it passes through the position of Fig. 5 to the position shown in Fig. 6; and that once disc 22 has moved in clockwise direction through the position shown in Fig. 6, the contacts 24, 25 will remain separated for all subsequent movements of the disc 22 in either direction until in moving in counterclockwise direction it passes through the position shown in Fig. 6 to the position shown in Fig. 5. The contacts 24, 25 are separated whenever disc 22 moves in clockwise direction through the relative position shown in Fig. 5; the separation is effected rapidly and always at that same position no matter if disc 22 moves slowly and no matter what may be the control point setting of disc 23. There is no open-circuit position of disc 22 for which the contacts 24, 25 remain so close they may intermittently engage because of vibration transmitted, for example, from adjacent machinery.

When the roller 70 engages the disc 22 within the limits generally defined by angle A, Fig. 7, the spring arms 40, 50 exert upon the disc a torque tending to move it in clockwise direction. The power transmitted to shaft 16 by the restoring cams 18 is, however, more than sufficient to overcome this torque. To avoid movement of shaft 16 by that torque when one or the other of cams 18 is out of engagement with driving clutch member 10, there is provided a brake 75 comprising brake shoe 76 for engaging the rim of clutch disc 15, Figs. 1 and 3.

When either of the sweep cams 18 engages the driving clutch member 10, a circuit is completed through the electromagnet 77 which by attraction of its armature 80 moves the brake shoe 76 away from engagement with the driven clutch member 15 in opposition to spring 78. At conclusion of the resetting adjustment of the driving clutch member 10, it is free of engagement with cams 18 to interrupt the circuit of electromagnet 77, whereupon spring 77 returns brake shoe 76 into engagement with the driven clutch member 15 so as to preclude any disturbance of its setting by reaction of the control switch CS upon its operating disc 22.

By proper adjustment or selection of spring 78, electromagnet 77 may be dispensed with; with this modification, the brake 75 is not released during setting of shaft 16 but is overcome by the relatively large torque exerted by one or the other of cams 18. The relatively small torque exerted by switch CS for certain of its positions is, however, incapable of moving shaft 16 against the brake. When the brake 75 is continuously on, the construction shown in Fig. 13 is preferred because of its simplicity. The brake shoe 76A of material having suitably high coefficient of friction is continuously pressed, by spring 78A, against the rear face of the driven clutch member 15. The brake is sufficient to hold shaft 16 and all parts attached thereto in position notwithstanding the forces transmitted to disc 22 from switch CS but incapable of holding those parts against movement by cams 18.

Use of the control switch device of Figs. 4 to 7 is not limited to the self-balancing mechanism or system shown in Figs. 2 and 3; it may, for example, be associated with the shaft 9 (corresponding with shaft 16 hereof) of the recorder shown in Letters Patent 2,124,684 to Behr et al.

In the modified control switch shown in Fig. 12, the resilient arm 44A which carries armature 44 is attached to block 52 and also carries the outer contact 25A. The inner contact 24A is carried by arm 40A having a sleeve 81 which threadably receives stud 82 to which is attached a stop button 83, of insulating material, for engagement with the resilient arm 50A. With this modification, the bar 49A need not be of insulation and magnet 56 need not be insulated from arm 50A. This form of my invention is otherwise generally similar in construction and operation to the control switch shown in Figs. 3–11.

The blocks 42, 52 may carry two or more of the switches, similar in construction and each with its individual control disc 22. The control discs may be maintained in desired angular relation with respect to each other by a clamping screw passing through slots 84 thereof. This multiple arrangement may be used, for example, when it is desired to actuate different signals at two predetermined magnitudes of the condition being controlled and/or observed.

What I claim is:

1. The combination with a self-balancing system comprising means responsive to unbalance of said system, a member adjustable to rebalance said system, a control member adjustable with said rebalancing member, and means controlled by said responsive means intermittently effective to adjust said members, of a control device actuatable by said control member in opposition to a biasing force, and braking means effective to prevent undesired movement of said rebalancing and control members by said biasing force.

2. In a self-balancing system comprising a member, and means for intermittently adjusting said member in sense and to extent corresponding with the sense and extent of unbalance of said system, a switch comprising contacts mounted independently of said member and moved thereby toward and from engagement with each other upon movement of said member in reverse directions through a predetermined position, and braking means effective to prevent undesired movement of said member by reaction of said switch thereon.

3. In a control apparatus comprising two members adjustable angularly about a common axis, one of said members being adjustable to a position corresponding with the existing magnitude of a condition and the other of said members being adjustable to a position corresponding with a selected magnitude of said condition, cam structure movable with one of said members, a switch movable with the other of said members, and means for effecting abrupt opening and closure of said switch upon relative movement of said members in opposite directions through relative positions corresponding with said selected magnitude of said condition comprising a magnet and its armature associated with respective contacts of said switch, a cam follower actuated by said cam structure to effect movement of said magnet and one of said contacts, and a second cam follower actuated by said cam structure to effect movement of said armature and the other of said contacts.

4. In a control apparatus comprising a member movable in response to changes in magnitude of a condition, a switch with respect to which said member is movable comprising contacts held in engagement with each other by said member throughout one portion of its range of movement and held from engagement with each other by said member throughout a contiguous portion of its range of movement, and means controlled by said member upon movement from one to the other of said portions of its range of movement to effect substantial relative movement of said contacts toward or from engagement with each other in dependence upon the direction of movement of said member.

5. Control apparatus comprising a switch, a control element therefor rotatable with respect to said switch in opposite directions through and beyond a control point to extents unlimited by said switch, and means ensuring opening and closure of the switch at angular positions of said element in substantially different from said control point comprising a magnet and its armature carried respectively by two movable members of said switch and individually actuated by said control element as it moves with respect thereto in passing through said control point.

6. Control apparatus comprising two movable members, a magnet and its armature carried by said members respectively, and a control element rotatable in one direction with respect to said members to effect their abrupt separation in opposition to attraction between said magnet and its armature and rotatable in reverse direction to provide for abrupt movement of said members toward each other by the attraction between said magnet and its armature.

7. Control apparatus comprising a cam, movable switch contacts, a magnet and its armature associated with said contacts respectively, a cam follower actuated by said cam to effect movement of said magnet and one of said contacts, and a cam follower actuated by said cam to effect movement of said armature and the other of said contacts.

8. Control apparatus comprising a cam movable in either direction toward and beyond a control point, two movable members, a magnet and its armature carried by said movable members respectively, and two followers biased into engagement with said cam and interposed between it and said movable members respectively to effect for movement of said cam in one direction through said control point abrupt separation of said members in opposition to attraction between said magnet and its armature and to effect for movement of said cam in reverse direction through said control point abrupt movement of said members into engagement with each other by the attraction between said magnet and its armature.

9. Control apparatus comprising a cam movable in opposite directions through a control point, members biased toward said cam, a magnet and its armature carried by said members respectively, a switch comprising contacts associated with said members respectively, and cam followers interposed between said cam and said members respectively to cause movement of said members concurrently in opposite directions as said cam passes through said control point to effect, in dependence upon the direction of movement of said cam, separation of said contacts in opposition to the attraction between said armature and magnet or engagement of said contacts by said attraction.

10. Control apparatus comprising a cam movable in opposite directions through and beyond a control point, a member biased toward said cam, a cam follower interposed between said member and said cam, a second member biased toward said cam, a magnet carried by one of said members, an armature carried by the other of said members, a second cam follower interposed between said cam and said second member, and a switch comprising contacts associated with said magnet and armature respectively, said cam followers coacting with said cam, said magnet and armature to effect abrupt separation of said contacts for movement of said cam in one direction through said control point and to effect abrupt engagement of said contacts for reverse movement of said cam through said control point.

11. Control apparatus comprising a cam movable in opposite directions through and beyond a control point, movable switch contacts biased toward said cam, a magnet and its armature associated with said contacts respectively, a cam follower effective for movement of said cam in either direction on one side of said control point to maintain said contacts separated and abruptly to separate said contacts against the attraction of said magnet and armature upon movement of said cam in one direction through said control point, and a second cam follower effective for movement of said cam in either direction on the other side of said control point to maintain said contacts in engagement and upon movement of said cam in reverse direction through said control point to effect such relative position of said armature and magnet that the attraction between them effects engagement of said contacts.

12. Control apparatus comprising movable switch contacts, a magnet and its armature associated with said contacts respectively, a cam follower associated with said magnet and one of said contacts, a second cam follower associated with said armature and the other of said contacts, and a cam coacting with at least one of said cam followers upon movement in one direction through a predetermined position to effect relative movement of said magnet and its armature to a position for which the attraction between them causes abrupt movement of said contacts into engagement with each other independently of said cam and coacting with at least the other of said cam followers upon reverse movement of the cam through said position abruptly to separate said magnet and its armature with consequent rapid separation of said contacts independently of said cam.

13. Control apparatus comprising movable switch members, a magnet and its armature associated with said members respectively, cam structure movable in opposite directions through a control point, and means comprising said magnet and armature for ensuring abrupt movement of said switch members toward and from each other as said cam structure moves through said control point from opposite directions, a cam follower associated with one of said members and cooperating with one rise only of said cam structure, and a cam follower associated with the other of said members and cooperating only with another rise of said cam.

14. Control apparatus comprising movable switch members, a magnet and its armature associated with said members respectively, a notched cam movable in opposite directions through a control point, and means comprising said magnet and armature for ensuring abrupt movement of said switch members toward and from each other as said cam moves in either direction through said control point, and cam followers associated with said members respectively and individually coacting with a notch in said cam to effect movement of said members in opposite directions as said cam moves in either direction through said control point.

15. Control apparatus comprising a cam movable in either direction through a control point and having a notch, movable switch members biased toward said cam, a magnet and its armature carried by said members respectively, a pivoted cam follower carried by one of said members and coacting with said notch for movement of said cam in one direction through said control point to move said one of said members in opposition to its bias to a position for which the attraction between said magnet and its armature effects relative movement of said members, and a second cam follower coacting with said notch for movement of said cam in the opposite direction through said control point to effect separation of said members in opposition to the attraction between said magnet and its armature.

16. Control apparatus comprising a cam rotatable in either direction through a control point, resilient switch members extending toward each other from spaced supports, a magnet and its armature carried by said members, a cam follower associated with one of said members to effect its movement away from the other of said members in opposition to the attraction between said magnet and armature upon rotation of said cam in one direction through said control point, and a second cam follower associated with the other of said members effective upon rotation of said cam in reverse direction through the control point to initiate a movement of said other of said members toward said one of said members which is completed by said attraction between said magnet and its armature.

17. Control apparatus comprising a cam movable in either direction through a control point, resilient switch members biased toward said cam and carrying contacts, an armature carried by one of said members, a magnet carried by the other of said members, a cam follower, a stop extending from said one of said members for engagement with said cam followers to determine one limiting position of one of said switch members and to effect separation of said contacts in opposition to the attraction between said magnet and its armature for movement of said cam in one direction through said control point, a stop extending from the other of said members for engagement with fixed structure to determine one of its limiting positions, and a cam follower carried by the other of said members to effect wiping movement of said contacts while in engagement with each other and to initiate their movement toward engagement as said cam moves in reverse direction through said control point for completion of their said movement by attraction between said magnet and its armature.

18. Control apparatus comprising a cam rotatable in either direction through a control point, resilient switch members extending in the same direction from adjacent supports, a magnet and its armature carried by said members, a cam follower associated with one of said members to effect their separation in opposition to the attraction between said magnet and its armature upon rotation of said cam in one direction through said control point, and a second cam follower associated with the other of said members effective upon reverse rotation of said cam through the control point to initiate movement of said members toward each other completed by said attraction between the magnet and its armature.

19. Control apparatus comprising a cam member and a supporting member angularly adjustable about a common axis, one of said members being adjustable to a position corresponding with the existing magnitude of a condition and the other of aforesaid members being adjustable to a position corresponding with a desired magnitude of said condition, and means for effecting a control for predetermined relative position of aforesaid members unaffected by slowness of adjustment of said other of said members or by the selected position of said one of said members comprising switch members carried by said supporting member and spring-biased toward said cam member, cam followers biased toward said cam member and associated with said switch members respectively, and a magnet and its armature carried by said switch members respectively to complete relative movement of them initiated by said member through one or the other of said followers.

20. In combination with a rotatable control member intermittently angularly adjusted to position corresponding with the magnitude of a condition, a control device actuated by said control member, and means for ensuring actuation of relatively movable elements of said control device, at a nicely predetermined angular position of said control member upon its movement relative to said control device in either direction, comprising a magnet and its armature associated with respectively said elements of said control device.

21. In combination with a rotatable control member intermittently angularly adjusted to position nicely corresponding with the magnitude of a condition, a control device actuatable in opposition to a biasing force by said control member upon relative movement thereof through a predetermined angular position, and braking means effective to prevent undesired movement of said control member by said biasing force from its aforesaid position.

RAYMOND W. ROSS.